United States Patent
Fisher et al.

(10) Patent No.: US 9,557,908 B1
(45) Date of Patent: *Jan. 31, 2017

(54) METHODS AND SYSTEMS FOR RENDERING IN A MULTI-PROCESS BROWSER USING A SHARED MEMORY AREA

(71) Applicant: Google Inc., Mountain View, CA (US)

(72) Inventors: Darin Fisher, San Carlos, CA (US); Brett Wilson, Los Gatos, CA (US)

(73) Assignee: Google Inc., Mountain View, CA (US)

( * ) Notice: Subject to any disclaimer, the term of this patent is extended or adjusted under 35 U.S.C. 154(b) by 150 days.

This patent is subject to a terminal disclaimer.

(21) Appl. No.: 14/306,634

(22) Filed: Jun. 17, 2014

Related U.S. Application Data (63) Continuation of application No. 12/464,643, filed on May 12, 2009, now Pat. No. 8,817,054.

(60) Provisional application No. 61/052,814, filed on May 13, 2008.

(51) Int. Cl.
    *G06F 3/14* (2006.01)
    *G06F 3/0485* (2013.01)

(52) U.S. Cl.
    CPC .................................. *G06F 3/0485* (2013.01)

(58) Field of Classification Search
    CPC ..................................... G06F 3/14; G06F 3/17
    USPC .......... 715/760; 705/27.1; 345/419; 358/538
    See application file for complete search history.

(56) References Cited

U.S. PATENT DOCUMENTS

| | | | | |
|---|---|---|---|---|
| 6,084,984 A | * | 7/2000 | Ishikawa | G06T 11/60 358/538 |
| 6,496,183 B1 | * | 12/2002 | Bar-Nahum | G06T 15/005 345/419 |
| 2008/0109327 A1 | * | 5/2008 | Mayle | G06Q 30/0641 705/27.1 |

* cited by examiner

*Primary Examiner* — Ruay Ho
(74) *Attorney, Agent, or Firm* — McDermott Will & Emery LLP (57) ABSTRACT

Systems and methods for rendering web content in a browser are described herein. An embodiment includes a web rendering engine in a rendering engine process to generate one or more requests to selectively redraw one or more regions of content retrieved by a browser process. A renderview then generates a bitmap based on the requests and content retrieved by the browser process. The bitmap may then be stored by the renderview in a shared memory area where it may be accessed by a renderview host in the browser process. The renderview host may then provide the bitmap to a backing store associated with a display device for display to a user. In another embodiment, the shared memory area between the browser process and the rendering engine process may be used to achieve efficient scrolling of a web page through rate limited rendering of content.

21 Claims, 10 Drawing Sheets

METHODS AND SYSTEMS FOR RENDERING IN A MULTI-PROCESS BROWSER USING A SHARED MEMORY AREA

CROSS REFERENCE TO RELATED APPLICATIONS

This application is a continuation of U.S. application Ser. No. 12/464,643, filed May 12, 2009, which claims the benefit of U.S. Provisional Appl. No. 61/052,814, filed May 13, 2008, each of which is hereby incorporated by reference in its entirety.

BACKGROUND

Field of the Invention

Embodiments of the present invention relate to browser technology.

Background Art

Browsers are used to access web content or locally stored content. The location of such content is often identified by a location address such as a uniform resource locator (URL). A browser may use a URL to access content associated with the URL. A user can interact with a browser through a user-interface to direct a browser to different content areas.

Content areas may contain text, audio, video and other forms of content delivery. Content requested by a user through a browser needs to be rendered for display so that the user can view the content using a display device such as a monitor.

Content delivered across networks such as the Internet has become increasingly rich in information and interactivity. To interact with such content, users are usually provided which various types of interfaces ranging from touch-screen interfaces to voice driven interfaces in addition to standard windowed interfaces.

User interfaces which allow interaction with content are usually most effective when they are more responsive. For example, consider a touch screen interface which allows a user to interact with a map through a browser. If in this case, the map is not rendered for display as fast as the touch screen perceives a user's touch driven gesture, it results in a poor user experience. Similarly there are other forms of user interfaces, which are effective only if data is rendered for display at a rate that matches or is close to the rate of user's interaction. Furthermore, older forms or user interface techniques or standard user windowed interfaces will be considerably more effective if rendering of data represented by them is improved.

In some cases, a user interface of a browser may become unresponsive due to improper rendering of content for display. A browser's user interface may also become unresponsive if it is waiting for content to be rendered for display. Loss of ability to interact with the user interface of a browser may lead to poor user experience.

BRIEF SUMMARY

Embodiments of the present invention relate to systems and methods for rendering web content in a browser. An embodiment includes a web rendering engine in a rendering engine process to generate one or more requests to selectively redraw one or more regions of content retrieved by a browser process. As an example, such requests may be generated in response to user interaction with a browser process. An example of user interaction may be scrolling of content.

A render view generates a bitmap based on the requests and content retrieved by the browser process. The bitmap may then be stored by the renderview in a shared memory area where it may be accessed by a renderview host in the browser process. The renderview host may then provide the bitmap to a backing store associated with a display device for display to a user. As an example, a backing store may be a form of a device dependent bitmap.

In this way, one feature is performance of a rendering process may be improved by selectively redrawing region(s) of content based on one or more requests generated by a web rendering engine and by use of a shared memory area. Furthermore, a browser process need not be dependent on a rendering engine process to modify a backing store associated with a display device. Since, a browser process updates a backing store associated with a display device, the browser process is not blocked waiting for a rendering engine process to render content for display. In an example the browser process and the rendering engine process can be run on independent threads further reducing the likelihood of the browser process being blocked or waiting for the rendering engine process and vice versa.

In another embodiment, the shared memory area between the browser process and the rendering engine process may be used to achieve efficient scrolling of content through rate limited rendering.

Further embodiments, features, and advantages of the invention, as well as the structure and operation of the various embodiments of the invention are described in detail below with reference to accompanying drawings.

BRIEF DESCRIPTION OF THE DRAWINGS

Embodiments of the present invention are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION

Embodiments of the present invention relate to systems and methods for rendering in a browser. In embodiments of the invention, performance of a rendering process may be improved by selectively redrawing one or more regions of content and by use of a shared memory area. Furthermore a browser process need not be dependent on a rendering engine process to update a backing store used by a display device. In this way, content retrieved by a browser process is rendered for display to a user in an efficient manner and may improve user experience.

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

The term "content area" used herein refers to an area of a user interface display that can display content addressed by an address, such as, a URL or a file name. As an illustrative example, the content displayed in the content area may include, for example, a web page, application, document, video, multimedia content, future utilized content mechanism, or any combination thereof. These examples are illustrative and are not intended to limit the definition.

The term "thread" used herein refers a sequence of executing instructions that can run independently of any other threads yet can directly share data with other threads if any are present.

The term "bitmap" used herein refers to data in a content area that can be rendered for display or modified and then rendered for display. As an example, a bitmap may be a group of one or more pixels representing content. This example is illustrative and not intended to limit the invention.

The detailed description of the embodiments of the present invention is divided into several sections as shown by the following table of contents.

TABLE OF CONTENTS

1. System
2. Overall Operation
3. Renderview
    3.1 Paint Trigger
    3.2 Request Aggregator
4. Rate Limited Rendering
5. Example Requests
6. Conclusion

1. SYSTEM

Figure 1:
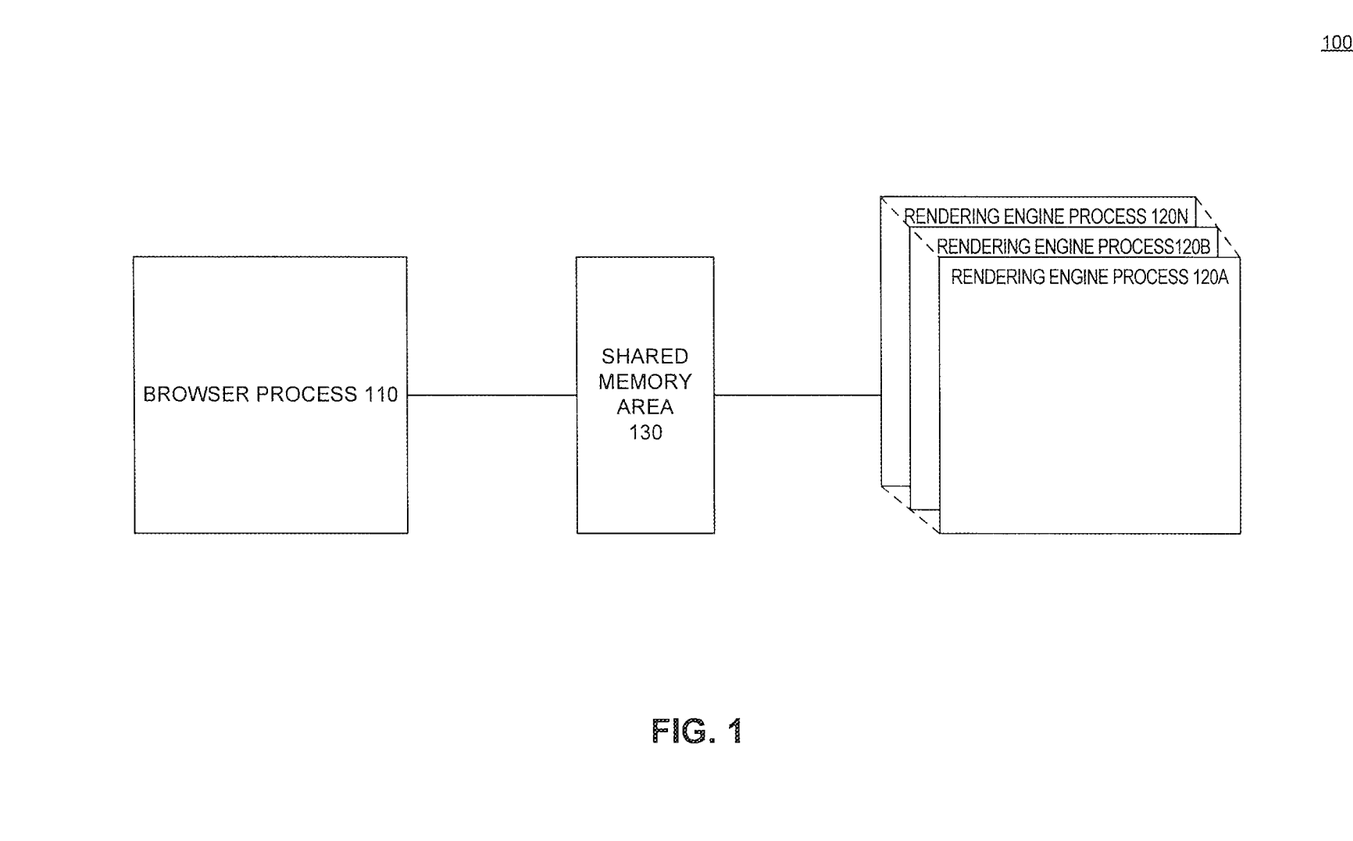
FIG. 1 is a diagram of a system for rendering in a browser according to an embodiment.
Figure 2:
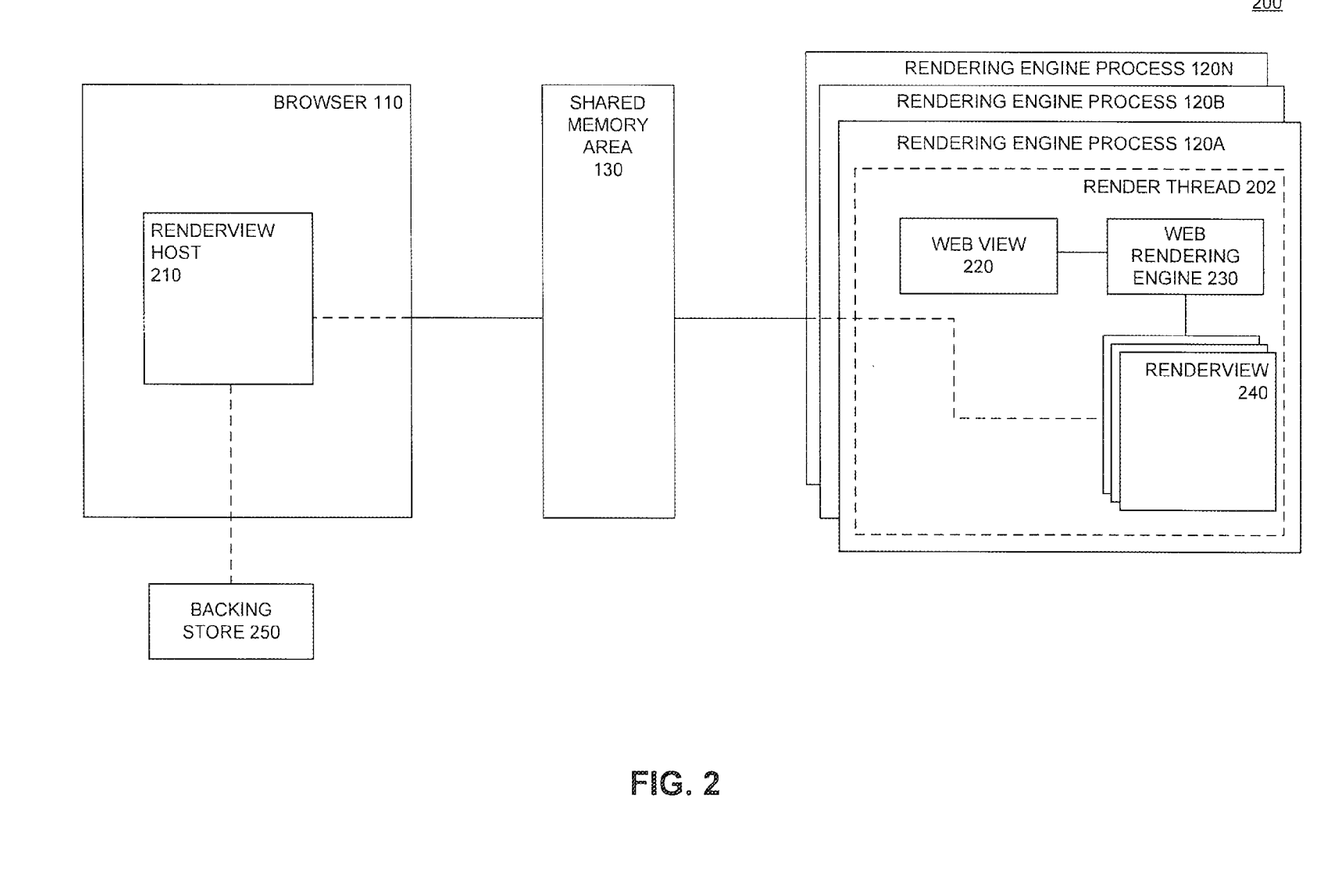
FIG. 2 is a diagram illustrating the system of FIG. 1 in further detail.

This section describes a browser according to an embodiment with respect to FIG. 1-2A.

FIG. 1 is a diagram of system 100 according to an embodiment. In one example, system 100 is implemented as a browser.

System 100 may be implemented on any device that can support browsing. Such a device may include, but is not limited to, a device having a processor and memory for executing and storing instructions. Such a device may include software, firmware, and/or hardware. Software may include one or more applications and an operating system. Hardware can include, but is not limited to, a processor, memory and user interface display. Optional input devices, such as a keyboard, a mouse, a touch sensitive screen, joystick, or other interface device may be used.

System 100 may contact a remote server (not shown) and download data to display. In examples, the data may be represented as hypertext markup language, dynamic hypertext markup language, extendable markup language, image data, video or sound. In another example, browser 100 may download and execute scripts according to the AJAX (Asynchronous JavaScript and XML) framework. The AJAX framework may asynchronously transmit and receive data from a server to system 100 update a content area without reloading the content area.

System 100 includes a browser process 110 coupled to one or a plurality of rendering engine processes 120A-N through shared memory area 130. Browser process 110 can communicate with one or more web servers (not shown) over one or more networks, such as the Internet. Browser process 110 can further communicate with an input (not shown) to allow a user to input data, to input commands, or to provide other control information to browser process 110. Rendering engine process(es) 120A-N can render data for display at a client device running browser process 110.

Browser process 110 and rendering engine process(es) 120A-N may communicate through shared memory area 130. Shared memory area 130 may be any form of volatile or non-volatile memory that can be used to store data. Shared memory area 130 is described in detail further in the description.

FIG. 2 is a diagram 200 illustrating the components of system 100 in further detail.

As shown in FIG. 2, browser process 110 may further include a renderview host 210. Renderview host 210 may have the ability to communicate with shared memory area 130. In an embodiment, renderview host 210 may obtain a bitmap from shared memory area that has been stored by renderview 240.

Renderview host 210 may communicate with a backing store 250. Backing store 250 may be a form of a device dependant bitmap. A device dependent bitmap (DDB) may be a form of image data that is stored in a format specific to a display device. In an embodiment, renderview host 210 may update backing store 250 with a bitmap that it may retrieve from shared memory area 130.

Rendering engine process 120A-N may include a render thread 202. Render thread 202 may further include webview 220, web rendering engine 230 and renderview 240.

Webview 220 may be a data structure that maintains the logical state of a web page. In an embodiment, webview 220 may be instantiated in render thread 202 by renderview 240. In an embodiment, webview 220 maintains a single content area. For example, such a content area may be a web page.

Web rendering engine 230 may communicate with webview 220 and renderview 240. In an embodiment, web rendering engine 230 may process scripts that may be included as a part of content retrieved by browser process 110. In an example, not intended to limit the invention, web rendering engine 230 may process JAVASCRIPT that may be a part of content retrieved by browser process 110. In another example web rendering engine 230 may be the WEBKIT, an open source web rendering engine available at http://www.webkit.org.

Renderview 240, in an embodiment, may receive one or more requests from web rendering engine 230. Such requests may be based on user input that may be received by browser process 210. For example, requests may include requests to scroll content retrieved by a browser process. Renderview 240 may process such requests and generate a bitmap corresponding to the requests from web rendering engine 230. Exemplary requests from web rendering engine 230 and bitmap generation by renderview 240 are explained in detail further in the description.

The overall operation of system 100 in an exemplary embodiment is explained in the next section.

2. OVERALL OPERATION

Figure 3:
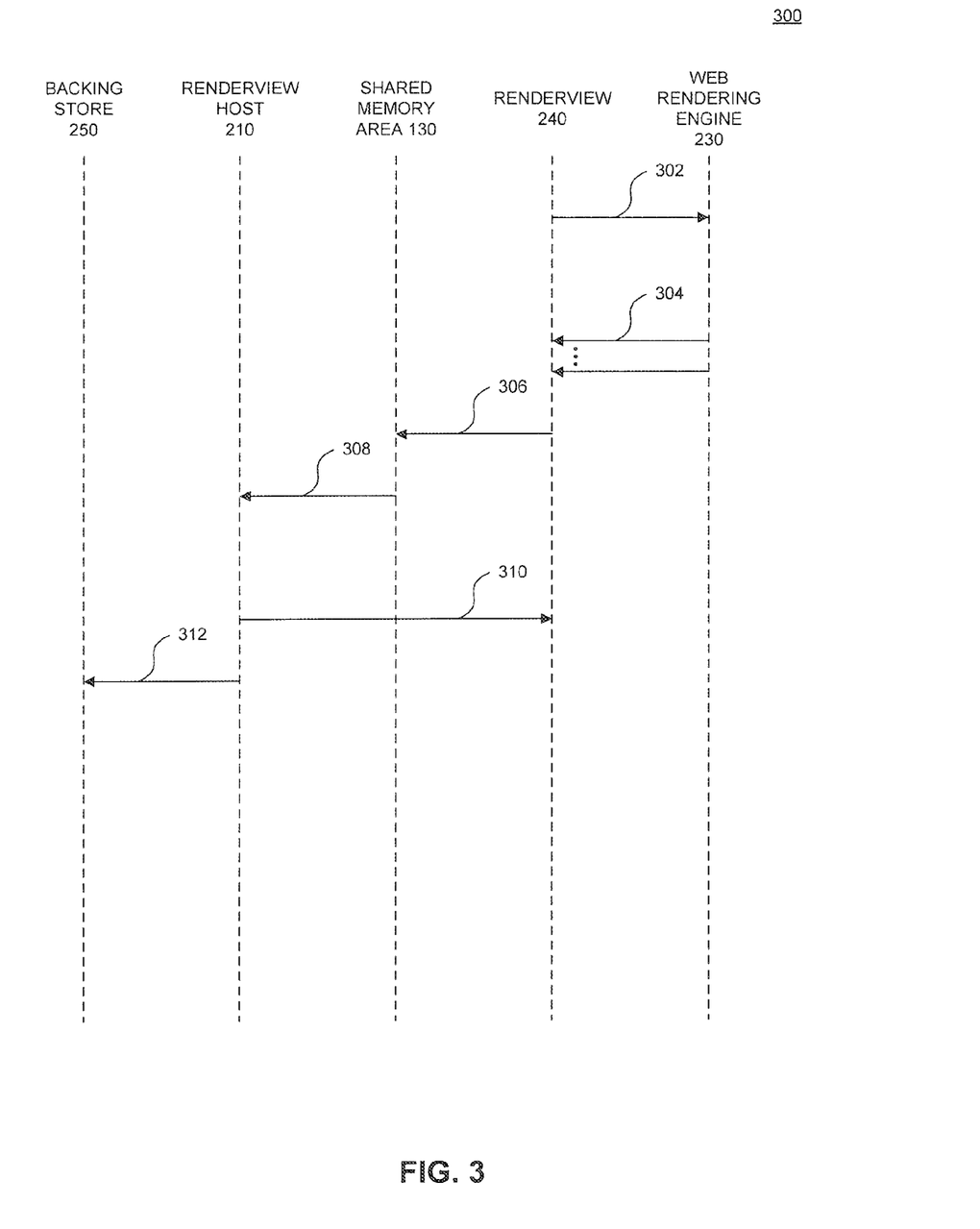
FIG. 3 is a flow diagram illustrating various stages in the operation of an embodiment.

This section describes the overall operation of system 100 with respect to flow diagram 300 illustrated by FIG. 3.

Flow diagram 300 illustrates exemplary interaction between web rendering engine 230, renderview 240, shared memory area 130, renderview host 210 and backing store 250 in an embodiment of the invention.

Renderview 240 instantiates a web rendering engine 230 in render thread 202 (step 302). As an example, a respective web rendering engine 230 may be instantiated in each rendering engine process 120A-N. Web rendering engine 230 may generate one or more requests based on the logical state of content that may be included in webview 220. For example, state of content in web view 220 may change if a user scrolls an area of content such as a web page. Web rendering engine 230 may perceive this change and generate one or more requests that describe the change in the content. Web rendering engine 230 may then output one or more requests to renderview 240 (step 304).

Renderview 240 then processes the one or more requests received from web rendering engine 230 in step 304 and generates at least one bitmap that is stored in shared memory area 130 (step 306). As an example, such a bitmap can represent an updated state of content such as a webpage that has been scrolled to a new portion of the webpage.

Renderview host 210 in browser process retrieves the bitmap that may represent updated content from shared memory 130 (step 308). Render view host 210 may then provide an acknowledgement to renderview 240 (step 310).

Renderview host may then provide the bitmap retrieved from shared memory area 130 in step 308 to backing store 250 (step 312). In an embodiment, backing store 250 may be a device dependent bitmap (DDB) which may be present on physical hardware such as a graphics card or a computer monitor. A bitmap stored in backing store 250 or any other form of data structure may be represented on screen by a display device or similar forms of hardware.

In this way, browser process 110 may not depend upon a rendering engine process 120A-N to modify any memory the browser is dependent upon. Browser process 110 receives events from rendering engine process 120A-N and which are used to generate a bitmap to be stored in backing store 250. Thus, browser process 110 may not depend on rendering engine process 110 to update backing store 250.

Thus browser process 110 can always be responsive regardless of whether the rendering engine process 120A-N is busy or not busy. Since browser process 110 has access to backing store 250, which may include a recently used bitmap, it need not be blocked waiting for rendering engine process 120A-N.

The operation of architecture and operation of renderview 240 according to an embodiment of the invention is further explained in the next section.

3. RENDERVIEW

Figure 4:
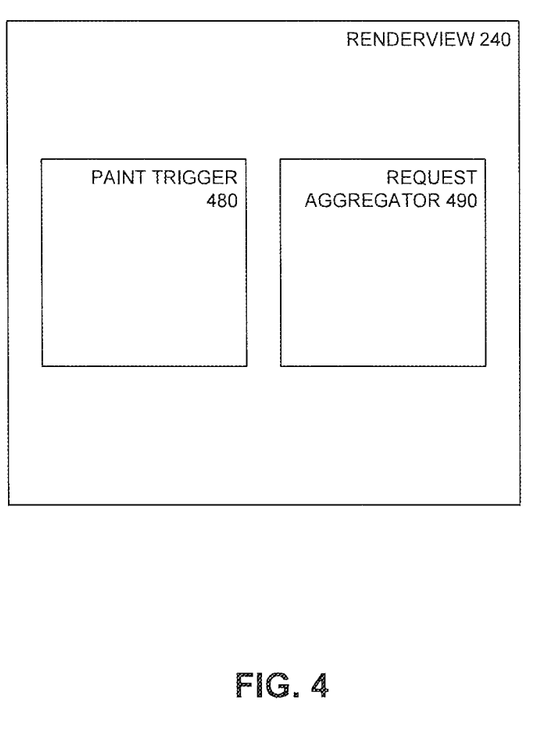
FIG. 4 is a diagram of a renderview according to an embodiment.

FIG. 4 shows a diagram of renderview 240 according to an embodiment of the invention. In an embodiment, renderview 240 includes paint trigger 480 and request aggregator 490.

3.1 Paint Trigger

In an embodiment, paint action trigger 480 may check if there is an "Invalidate Rectangle" signal from web rendering engine 230 and is a currently occurring paint operation has been completed by rendering engine process 120A-N. In an embodiment, not intended to limit the invention, if a paint operation is occurring asynchronously, rendering engine process 120A-N may would accumulate one or more "Invalidate Rectangle" signals from web rendering engine 230 till the first paint is being completed asynchronously. Thus paint trigger 480 allows only one paint operation to occur at a time and when a paint operation is initiated, for example, it may be an aggregation of a plurality of rectangular regions.

3.2 Request Aggregator

In an embodiment, request aggregator 490 aggregates messages generated by web rendering engine 230 into a single request based on an input from paint trigger 480. This may reduce the work done by renderview 240.

For example, if the one or more requests generated by web rendering engine 230 result in the entirety of a bitmap being redrawn, it may be more efficient to combine the requests into a single request to re-draw a new bitmap instead of making several modifications to an existing bitmap in shared memory area 130. In this way work done by renderview 240 may be reduced.

Figure 5:
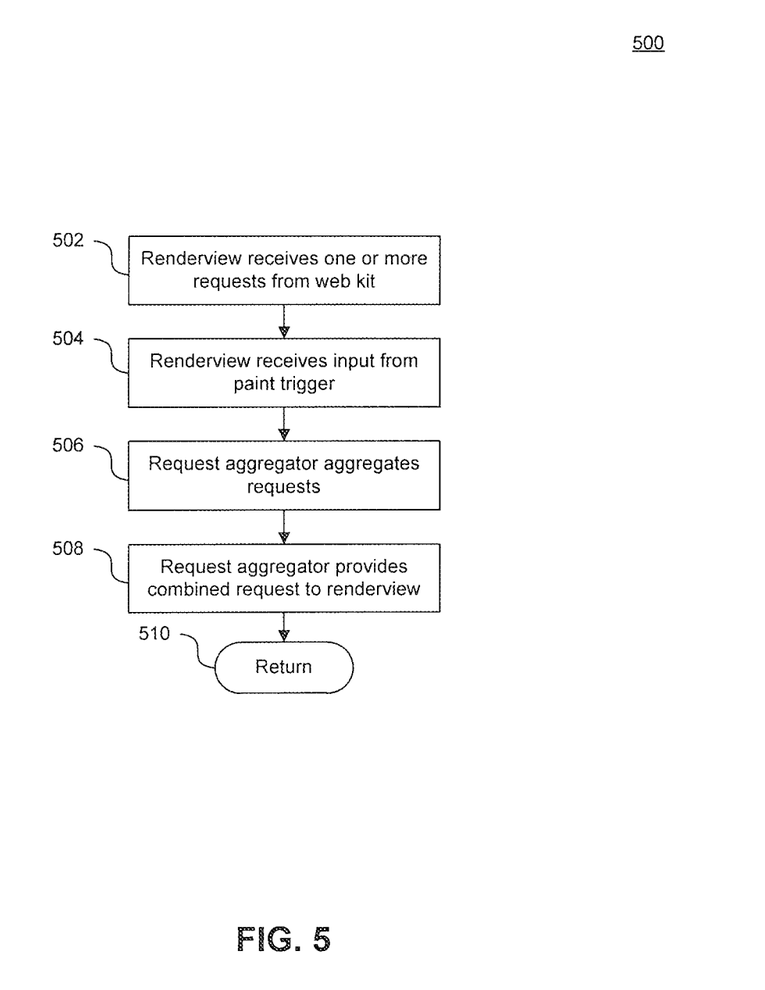
FIG. 5 is a flowchart which illustrates aggregation of requests generated by a web rendering engine according to an embodiment.

The operation of request aggregator 490 and paint trigger 480 is described further in detail in FIG. 5. FIG. 5 is a flowchart illustrating exemplary method 500 that may be used in an embodiment of the invention.

Renderview 240 receives one or more requests from web rendering engine 230 (step 502). Renderview 240 may then receive an input from paint trigger 480 (step 504). Request aggregator 490 aggregates the one or more requests received from web rendering engine 230 in step 502 in to a single request (step 506). Request aggregator 490 then provides the combined request to renderview 240 (step 508) and method 500 returns (step 510).

In this way, requests generated by web rendering engine 230 may be aggregated by request aggregator 490. This may reduce the amount of work done on renderview 240.

The next section of the description describes exemplary requests and processing of such requests in detail.

4. EXEMPLARY REQUESTS

This section describes a form of exemplary requests and the processing of requests by renderview 240.

Figure 6:
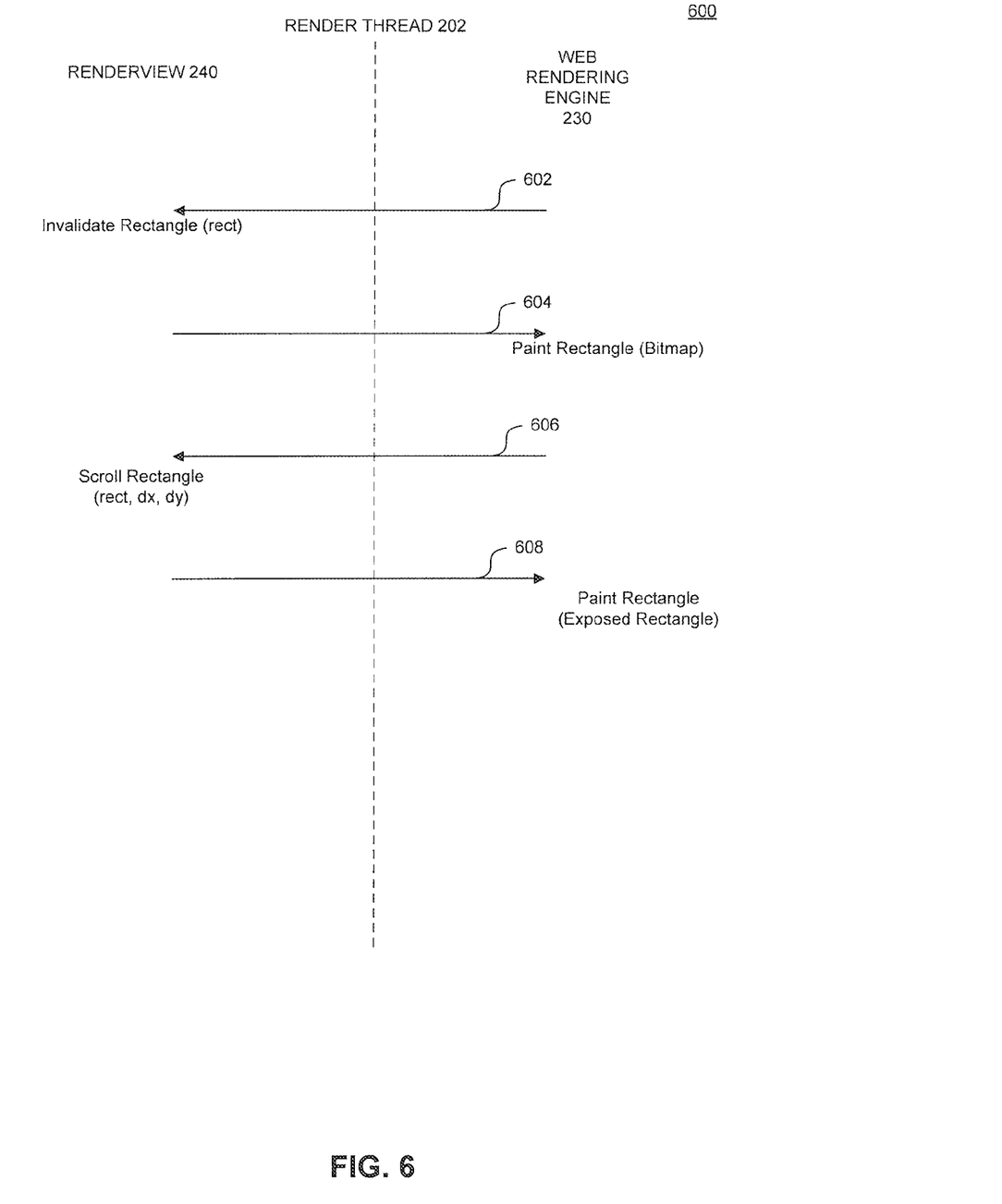
FIG. 6 is a flow diagram illustrating exemplary requests made between a web rendering engine and a renderview according to an embodiment.

FIG. 6 is a flow diagram 600 illustrating exemplary requests that may be transmitted between renderview 240 and web rendering engine 230.

For example, web rendering engine 230 may send an "Invalidate Rectangle" request to renderview 240 as shown in request 602. Such an "Invalidate Rectangle" request may be generated for example when a user has carried out a scrolling operation to view a portion of a web page, or other action that requires a new area to be redrawn and invalidates a current displayed rectangle. As an example request 602 may include the co-ordinates of a region of content that is to be re-drawn by renderview 240.

In response to request 602, renderview 240 may generate a "Paint Rectangle" request 604, generate an updated bitmap and store it in shared memory area 130.

Figure 7:
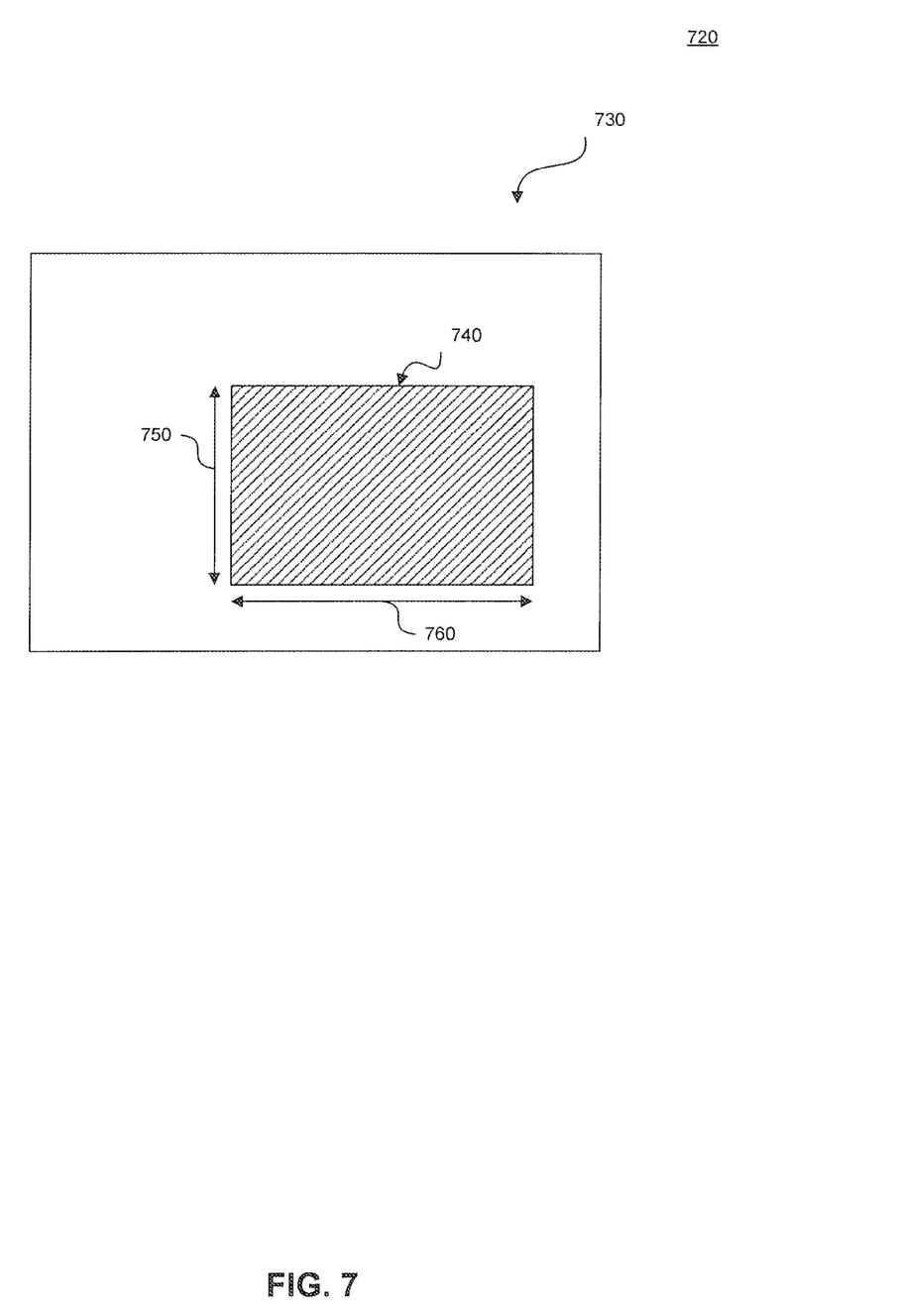
FIG. 7 is a diagram which is used to illustrate an invalidate request according to an embodiment.

FIG. 7 illustrates content area 730. Content area 730 comprises region 740 that has been updated. As an example, region 740 may be a region that may need to be re-rendered by rendering engine process 120A-N in response to an "Invalidate Rectangle" request from webview 230.

In an example, web rendering engine 230 may send a "Scroll Rectangle" request to renderview 240 as shown in request 606. As an example request 606 may include the co-ordinates of a region that is to scrolled or repositioned, a value of displacement in the 'x' direction (760) given by 'dx' and an amount of displacement in the 'y' direction given by 'dy' (750).

Figure 8:
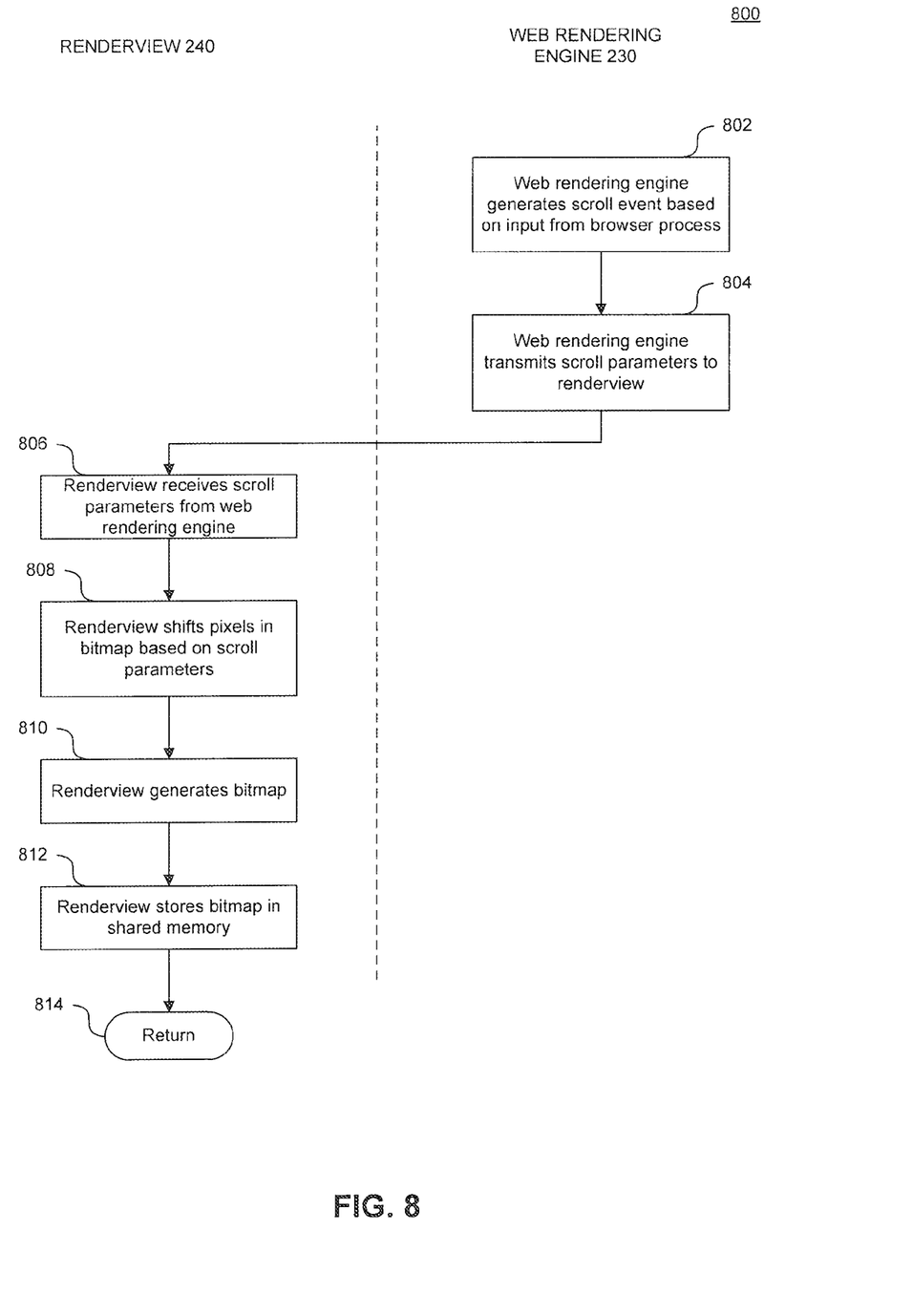
FIG. 8 is a flowchart which illustrates the processing of an exemplary scroll event according to an embodiment.

FIG. 8 illustrates method 800. Method 800 illustrates processing of an exemplary "Scroll Rectangle" request in an embodiment (steps 802-818).

Web rendering engine 230 may generate a scroll event based on an input from browser process 110 (step 802). As an example, such an input may be generated in response to a user scrolling a content retrieved by browser process 110.

Web rendering engine 230 then transmits scroll parameters to renderview 240 (step 804). As an example, scroll parameters may include a value of displacement such as 'dx' and 'dy'. Renderview 240 then receives the scroll parameters from web rendering engine 230 (step 806).

Renderview 240 may then shift the pixels in a bitmap representing content retrieved by browser process 110 (step 808). As an example, pixels may be shifted by value based on scroll parameters transmitted by web rendering engine in step 804.

Renderview 240 may then generate a bitmap that may represent a shift in pixels. (step 810). Renderview 240 may then store the bitmap in shared memory area 130 (step 812) and method 800 returns to await a new scroll event (step 814).

Figure 9:
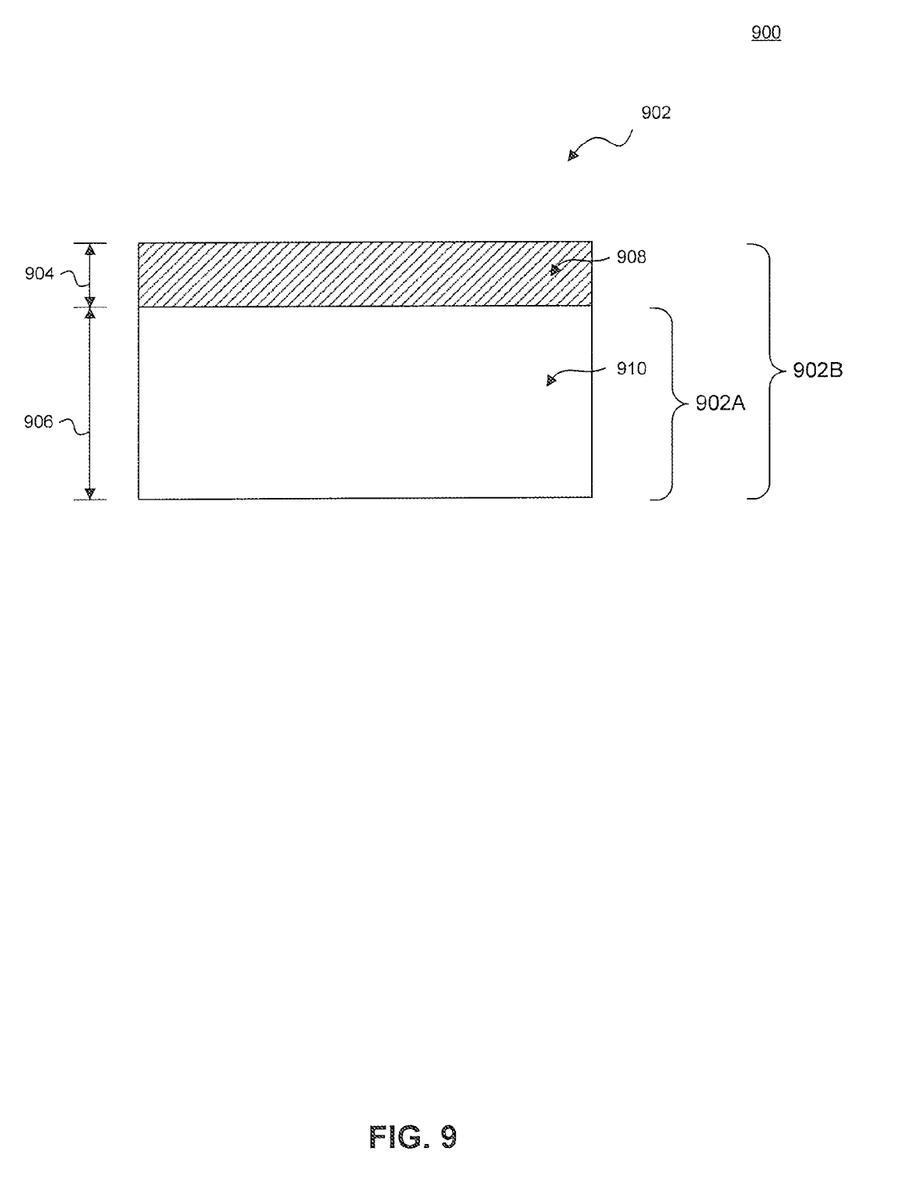
FIG. 9 is a diagram which is used to illustrate scrolling of a bitmap according to an embodiment.

FIG. 9 illustrates an exemplary content area before an and after a scrolling operation. Region 902A represents an exemplary content area that may be scrolled. Region 902B represents a state of content area 902A after it has been scrolled. Region 908 represents the area of content that has been scrolled down. Line 904 represents the displacement in the x direction or 'dx'. Region 910 represents the updated location of content area 902 after it has been displaced by 'dr'. Line 906 represents the length of region 910 in the x direction.

In an embodiment, rendering engine process 120A-N may generate shifted region 910 by shifting all pixels in region 902 by displacement 904 or 'dx'. Thus, region 910 need not be re-rendered by rendering engine process 120A-N. However, as an example, renderview 240 may identify and re-render region 908 that has been exposed as a result of a shift by 'dx'. Such re-rendering occurs by sending a "Paint Rectangle (Exposed Rectangle)" request as shown by request 608 of FIG. 6.

In this way, rendering engine process 120A-N efficiently scrolls a bitmap by shifting pixels.

These examples are meant to be illustrative and are not intended to limit the definition. For example, web rendering engine 230 may issue several requests concurrently or combine one or more requests into a single request. Furthermore, a request may be of any form and should not be limited to the number of parameters set forth in the exemplary requests or this description.

5. RATE LIMITED RENDERING

In an embodiment, web rendering engine 230 may generate one or more requests to scroll content retrieved by browser process 110. As an example, such requests may be generated in response to a user scrolling content retrieved by browser process 110.

For example, consider that a user needs to repeatedly scroll content retrieved by a browser process. As a result, web rendering engine 230 may generate several exemplary "Scroll Rectangle" requests and provide them to renderview 240. Renderview 240 may provide several updated bitmaps to renderview host 210 in browser process 110. This may result in work done by browser process 110 being substantially increased and may degrade performance of browser process 110.

In an embodiment, renderview 240 may not store an updated bitmap in shared memory area 130 until it receives an acknowledgement from renderview host 210 in browser process 110. In this way, rate limited rendering may be achieved. The rate of rendering of updated content is limited by browser process 110.

Figure 10:
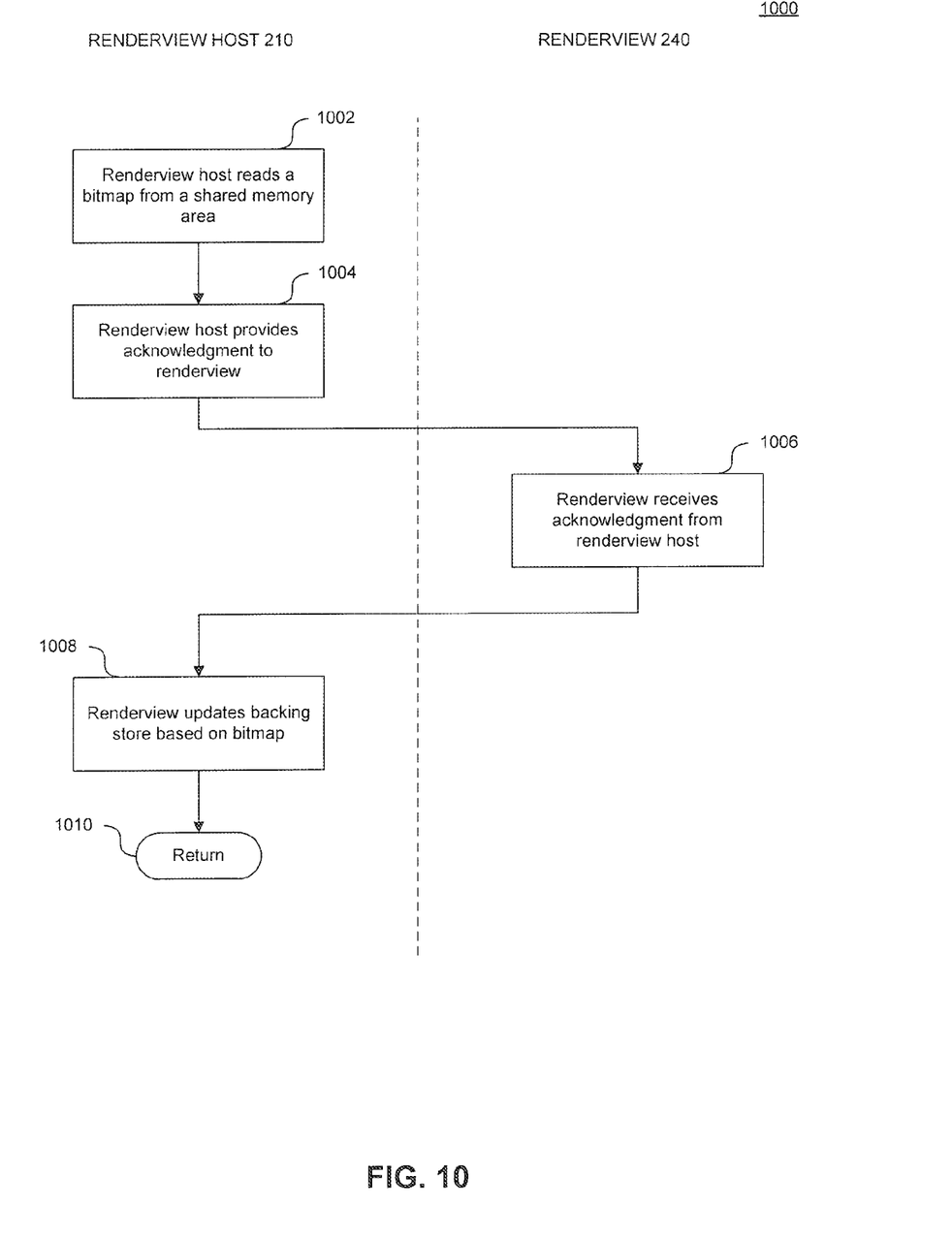
FIG. 10 is a flowchart which is used to illustrate rate limited rendering according to an embodiment.

FIG. 10 illustrates exemplary method 1000 that may be used to achieve rate limited rendering in an embodiment.

Method 1000 begins with a render view host 210 reading a bitmap from shared memory area 130 (step 1002). A bitmap, for example, may be stored by renderview 240 in response to a request from web rendering engine 230.

Renderview host 210 then provides an acknowledgement to renderview 240 (step 1004). Renderview 240 receives the acknowledgement provided by renderview host 210 (step 1006). Renderview host 210 then updates backing store 250 (step 1008) based on the bitmap read from shared memory area 130 in step 1002 and method 1000 returns (step 1010). Thus, renderview 240 transmits requests to renderview host 210 at a rate controlled by an acknowledgement signal generated by renderview 240 and reduces burden on renderview 240.

In this way, rate limited rendering may be achieved in an embodiment of the invention.

6. CONCLUSION

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the claims and their equivalents.

What is claimed is:

1. A system comprising:
a memory;
and at least one processor coupled to the memory, the at least one processor configured to:
retrieve content in a browser during a browser process;
generate one or more requests corresponding to a displacement in the content in response to a user interaction with the browser process;
aggregate the or more generated redraw requests selectively to generate one or more aggregated redraw requests;
transmit the one or more aggregated redraw requests at a rate controlled by an acknowledgement signal generated by the browser process;
scroll one or more regions of content based on the one or more transmitted aggregated redraw requests; and
redraw one or more regions of content based on the one or more transmitted aggregated redraw requests to update the content.

2. The system of claim 1, wherein the at least one processor is further configured to:
shift a first set of pixels corresponding to a region of content based on the one or more generated redraw requests and the one or more aggregated redraw requests, the first set of pixels being associated with a shared memory area shared by a rendering engine process and the browser process; and
update one or more locations in the shared memory area associated with the first set of pixels with a second set of pixels.

3. The system of claim 1, wherein the at least one processor is further configured to:
remove a third set of pixels from one or more locations in a shared memory area based on the one or more generated redraw requests and the one or more aggregated redraw requests, the shared memory area being shared by a rendering engine process and the browser process; and
place a fourth set of pixels at one or more locations in the shared memory area associated with the third set of pixels.

4. The system of claim 1, wherein the at least one processor is further configured to:
generate one of the redraw requests comprising a displacement in a horizontal direction and a displacement in a vertical direction in the content based on the user interaction with the browser process.

5. The system of claim 1, wherein the at least one processor is further configured to:
identify a number of the one or more generated redraw requests; and
identify a region of content to be updated by the one or more generated redraw requests.

6. The system of claim 1, the at least one processor is further configured to:
during the browser process:
read a bitmap from a shared memory area that is shared by a rendering engine process and the browser process, the bitmap being a group of one or more pixels representing updated content in response to the user interaction with the browser process, wherein the rendering engine process and the browser process are run on independent threads; and
provide the bitmap to a backing store associated with a display device.

7. The system of claim 1, wherein the one or more generated redraw requests comprises one or more coordinates of a region of content to be redrawn based on the user interaction with the browser process.

8. The system of claim 1, wherein the one or more generated redraw requests comprises a horizontal displacement value and a vertical displacement value of the content in the browser based on the user interaction with the browser process.

9. The system of claim 1, wherein the content is displaced based on an input generated in response to a user scrolling the content retrieved by the browser process.

10. The system of claim 1, further comprising:
a webview to maintain a logical state of content.

11. A system for rendering content in a browser comprising:
a memory;
and at least one processor coupled to the memory, the at least one processor configured to:
during a rendering engine process:
generate, using one or more processors, one or more requests corresponding to a displacement in the content, the displacement being based on a user input corresponding to a user scrolling the content retrieved by a browser process;
generate an updated bitmap based on the one or more requests and the content retrieved by the browser process, the updated bitmap representing a rendered output of the updated content based on the user input; and
store, in response to receiving an acknowledgement signal, the updated bitmap in a shared memory that is shared by the browser process and the rendering engine process; and
during the browser process:
provide the acknowledgement signal to the rendering engine process;
retrieve the updated bitmap from the shared memory after providing the acknowledgement signal; and
store the updated bitmap in a backing store associated with a display device for display to a user, wherein the rendering engine process and the browser process are run on independent threads.

12. The system of claim 11, wherein a web page includes the displaced content, and the displaced content has been scrolled to a new portion of the web page based on the user input.

13. A computer based system comprising:
one or more processors;
a web rendering engine to generate one or more rendering requests corresponding to displacement in content;
a request aggregator to selectively aggregate the rendering requests to generate one or more aggregated rendering requests; and
a render view to generate a bitmap by shifting and painting pixels in the bitmap based on at least the one or more rendering requests and the content,
wherein the web rendering engine, the request aggregator and the render view are implemented on the one or more processors.

14. The system of claim 13, further comprising a paint trigger to initiate a paint operation.

15. The system of claim 13, wherein the one or more rendering requests comprise a plurality of dimensions and a plurality of displacement values.

16. The system of claim 15, wherein the one or more rendering requests comprise at least a request to displace the bitmap.

17. The system of claim 16, wherein a renderview processes the request to displace the bitmap based on the plurality of dimensions and plurality of displacement values.

18. The system of claim 13, wherein the web rendering engine stores data included in the content.

19. The system of claim 13, further comprising:
a webview to maintain a logical state of content.

20. The system of claim 13, further comprising:
a shared memory area to store the bitmap associated with the content and a renderview host to read the bitmap from the shared memory area and provide the bitmap to a backing store.

21. The system of claim 13, wherein the web rendering engine and the render view are run on independent threads.

* * * * *

UNITED STATES PATENT AND TRADEMARK OFFICE
CERTIFICATE OF CORRECTION

PATENT NO. : 9,557,908 B1
APPLICATION NO. : 14/306634
DATED : January 31, 2017
INVENTOR(S) : Darin Fisher et al.

Page 1 of 1

It is certified that error appears in the above-identified patent and that said Letters Patent is hereby corrected as shown below:

In the Claims

Claim 1, Column 9, Line 15, "aggregate the or more" should read --aggregate the one or more--.

Signed and Sealed this
Sixth Day of August, 2019

Andrei Iancu
*Director of the United States Patent and Trademark Office*